United States Patent
Caldwell et al.

(10) Patent No.: US 7,343,218 B2
(45) Date of Patent: Mar. 11, 2008

(54) AUTOMATIC PART FEEDBACK COMPENSATION FOR LASER PLASTICS WELDING

(75) Inventors: Scott Caldwell, Fairport, NY (US); William Moreau, Jr., Bloomfield, NY (US); Hugh McNair, Webster, NY (US); Scott Latona, Rochester, NY (US)

(73) Assignee: Branson Ultrasonics Corporation, Danbury, CT (US)

( * ) Notice: Subject to any disclaimer, the term of this patent is extended or adjusted under 35 U.S.C. 154(b) by 0 days.

(21) Appl. No.: 11/430,943

(22) Filed: May 9, 2006

(65) Prior Publication Data

US 2007/0265726 A1    Nov. 15, 2007

(51) Int. Cl.
*G06F 19/00* (2006.01)
*B23K 26/00* (2006.01)
*B23K 26/42* (2006.01)

(52) U.S. Cl. ............... 700/166; 250/227.11; 264/1.37; 219/121.6; 219/121.63

(58) Field of Classification Search ............... 700/166; 250/227.11; 264/1.37; 219/121.6, 121.63
See application file for complete search history.

(56) References Cited

U.S. PATENT DOCUMENTS

| | | | |
|---|---|---|---|
| 6,160,568 A | 12/2000 | Brodsky et al. | |
| 6,204,469 B1 * | 3/2001 | Fields et al. | 219/121.6 |
| 6,330,831 B1 | 12/2001 | Lynnworth et al. | |
| 6,528,755 B2 | 3/2003 | Grewell et al. | |
| 6,663,297 B1 * | 12/2003 | Goldstein | 385/97 |
| 6,713,713 B1 * | 3/2004 | Caldwell et al. | 219/121.63 |
| 6,774,353 B2 * | 8/2004 | Caldwell et al. | 250/227.11 |
| 7,085,296 B2 | 8/2006 | Caldwell | |
| 2004/0012844 A1 * | 1/2004 | Ohtsuki et al. | 359/341.1 |

\* cited by examiner

*Primary Examiner*—Michael D. Masinick
(74) *Attorney, Agent, or Firm*—Harness, Dickey & Pierce, P.L.C.

(57) ABSTRACT

A feedback control system for controlling a laser source. The feedback control system includes a laser source outputting laser energy and an optical sensor detecting the laser energy. The optical sensor outputs a measured signal in response to a measured amount of the laser energy. The system further includes an optical device receiving the laser energy and directing the laser energy to a predetermined location. The optical device reflects a first portion of the laser energy toward the optical sensor. A controller receives the measured signal from the optical sensor and calculates the amount of the first portion of the laser energy. The controller then adjusts the laser source to correct for the losses associated with the first portion of the laser energy reflecting from the optical device to obtain a predetermined amount of laser energy at the predetermined location.

10 Claims, 3 Drawing Sheets

AUTOMATIC PART FEEDBACK COMPENSATION FOR LASER PLASTICS WELDING

FIELD

The present disclosure relates generally to plastics welding and, more particularly, relates to automatic part feedback compensation for laser plastics welding.

BACKGROUND AND SUMMARY

Currently, the art of welding plastic or resinous parts incorporates a variety of techniques including ultrasonic welding, heat welding, and, most recently, Through Transmission Infrared (TTIr) welding.

TTIr welding employs infrared light passed through a first plastic part and into a second plastic part. TTIR welding can use either infrared laser light or incoherent infrared light in the current art. Infrared laser light in the current art can be directed by fiber optics, waveguides, or light guides through the first plastic part and into a second plastic part. This first plastic part is often referred to as the transmissive piece, since it generally permits the laser beam from the laser to pass therethrough. The second plastic part is often referred to as absorptive piece, since this piece generally absorbs the radiative energy of the laser beam to produce heat in the welding zone. This heat in the welding zone causes the transmissive piece and the absorptive piece to be melted and thus welded together. However, control of the laser can be difficult and currently requires manual adjustment of the output of the laser source to achieve the desired laser heating effect. This manual adjustment is performed on a trial and error process and can be very laborious and time consuming.

According to the principles of the present teachings, it is desirable to control the output of the laser source to insure proper welding and, more particularly, it is desirable to control the output of the laser source through the use of closed loop feedback control.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
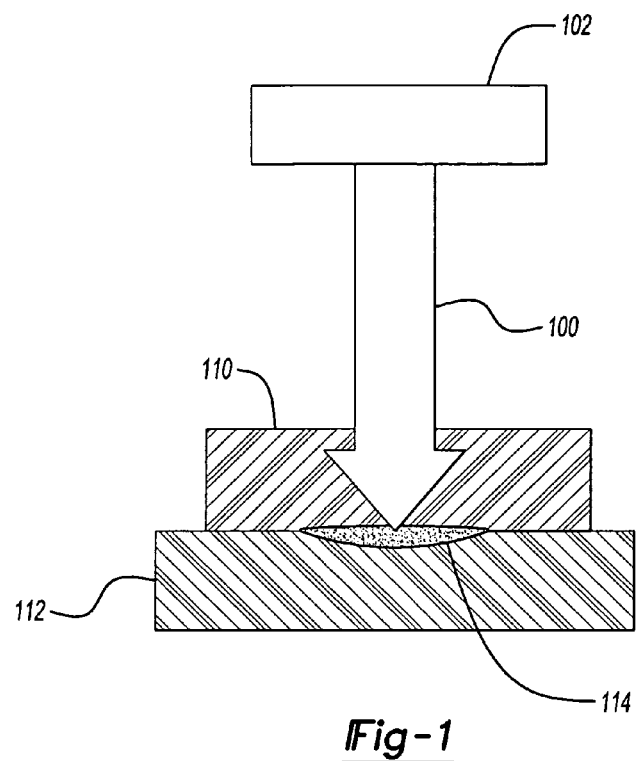
FIG. 1 is a schematic view illustrating a Through Transmission Infrared (TTIr) welding system.

As illustrated in FIG. 1, the principles of the present teachings provide a method and apparatus for use in Through Transmission Infrared (TTIr) welding. In general, in TTIr welding, infrared laser light 100 is directed from one or more laser sources 102 through an optical device, such as lightguides, waveguides, and/or fiber optics, to plastic parts to be welded. In this regard, first plastic part 110 is transmissive to infrared light and thus permits the infrared light to pass therethrough. Second plastic part 112 is absorptive to infrared light. Therefore, the laser light passes through first transmissive part 110 to second absorptive part 112, where it is converted to heat and in turn melts the plastic at weld joint 114 causing the parts to weld together. Alternatively, both parts can be transmissive to infrared light, in which case, a medium absorptive to infrared light can be positioned at weld joint 114 to absorb the infrared light and converts it to heat causing the parts to be welded. However, according to the principles of the present teachings, it is desirable to control the output of laser source 102 to insure proper welding and, more particularly, it is desirable to control the output of laser source 102 through the use of a novel closed loop feedback control.

Figure 2:
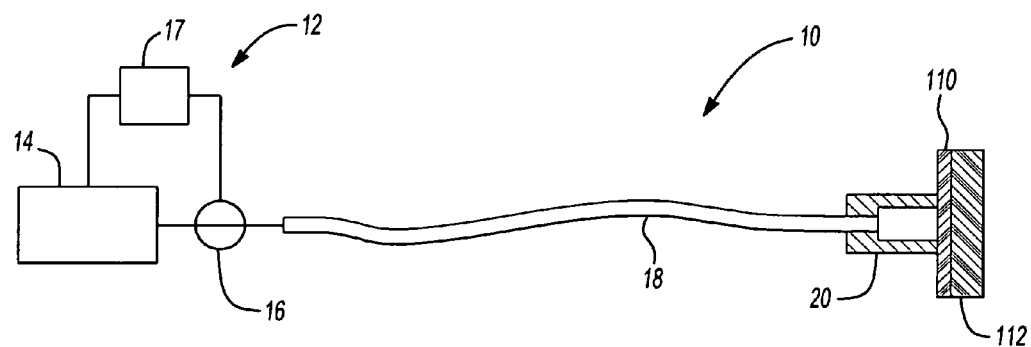
FIG. 2 is a schematic view illustrating a Through Transmission Infrared (TTIr) welding system using closed-loop feedback control.

Referring now to FIG. 2, in some embodiments, a feedback control system 12 is employed to provide feedback information in a TTIr laser plastics simultaneous plunge welding system 10 to monitor the laser intensity downstream from a laser source 14 (can be similar or identical to laser source 102). Feedback control system 12 comprises an optical sensor 16 positioned downstream from laser source 14, yet upstream from first transmissive part 110 and second absorptive part 112, and a control module 17. In some embodiments, optical sensor 16 is a photodiode. Control module 17 is operably coupled in electrical communication with optical sensor 16 for receiving real-time laser intensity information from laser source 14 and operably coupled in electrical communication with laser source 14 for controlling an output intensity of laser source 14.

In some embodiments, optical sensor 16 can be positioned upstream of a fiber optic member 18 and/or a waveguide 20 (illustrated), or can be positioned downstream of one or more of fiber optic member 18 and waveguide 20. In other words, optical sensor 16 can be positioned at any position between laser source 14 and first transmissive part 110. However, prior to monitoring, laser source 14 should be calibrated to a set value. Ideally, this calibration process is performed without parts or other tooling in place. In some embodiments, optical feedback sensor 16 is positioned upstream from the tooling, such as fiber optic member 18 and/or waveguide 20, thereby eliminating the need to change or replace optical feedback sensor 16 or feedback control system 12 during part or tooling changes.

The teachings of the present disclosure automatically compensate for such things as part and tool reflectivity in TTIr welding system 10 through the use of closed loop feedback control that enables quick and convenient tooling changes. More particularly, the teachings of the present disclosure permit tooling changes and part changes after feedback control system 12 is initially calibrated without throwing off or adversely effecting the feedback signal.

Step 1—In order to initially calibrate feedback control system 12 of TTIr welding system 10, laser source 14 is first fired in open loop mode without any tooling (i.e. fiber optic member 18 and/or waveguide 20) or part to be welded present, at an initial power level percentage, % $P_{initial}$ verified by an external meter. The signal from optical feedback sensor 16 in this condition is measured as an initial optical feedback signal, $V_{initial}$, stored electronically, and used as a baseline. This can be performed when TTIr welding system 10 is first manufactured, or at any time later, but only has to be performed once.

Step 2—Laser source 14 can then be fired in open loop mode with fiber optic member 18 and/or waveguide 20 in place at some known power percentage level, % $P_{tool}$. The optical feedback signal is then measured as $V_{tool}$, and stored electronically. The optical feedback signal with the tool, $V_{tool}$, will be higher than the initial optical feedback signal, $V_{initial}$, because of reflected light returning from the tooling. In other words, as light is output from laser source 14, it will travel down fiber optic member 18 and/or waveguide 20. Optical feedback sensor 16 will, in part, detect this output light. However, optical feedback sensor 16 will also detect a portion of light that is reflected back at optical feedback sensor 16 from fiber optic member 18 and/or waveguide 20. Therefore, the optical feedback signal with the tool, $V_{tool}$, includes the sum of the actual output light from laser source 14 and the amount of light that is reflected back at optical feedback sensor 16 due to the tooling. This step only needs to be performed when the tooling is changed.

Step 3—Laser source 14 can then be fired in open loop mode at a percentage of the full power level, % $P_{mirror}$, with the tooling in place and with a mirror with a known reflectivity, $R_{mirror}$, placed where parts 110, 112 will later be placed. The optical feedback is measured as $V_{mirror}$, and stored electronically. This step only needs to be performed when the tooling is changed.

It should be noted, however, that the measurement of the optical feedback signal in open loop with tooling in place (i.e. Step 2), and in open loop with both the tooling and mirror in place (i.e. Step 3) are not necessary steps for correcting for laser power delivered to the top of part 110. However, these steps are necessary for compensating for laser power delivered through part 110 down to weld zone 114. In other words, the reflectivity and/or absorption of part 110 may reduce the amount of laser light getting through to weld joint 114 and, therefore, laser source 14 should be compensated for this effect.

Step 4—Finally, laser source 14 is then fired in open loop mode with both the tooling and parts 110, 112 in place at some percentage of the full power level, % $P_{part}$. This optical feedback signal is measured as $V_{part}$, and once again stored electronically. This step can be performed once before an initial part run, for the new part, or before a series of new parts to account for the variability between part batches, or even before each individual part to account for individual part variation. Because only a percentage of the full laser power is being used, the power can be set below the welding threshold of parts 110, 112, thus allowing the feedback signal to be measured without sacrificing the integrity of parts 110, 112.

During actual welding in closed loop mode, the feedback signal, $V_{actual}$ is modified to a corrected value, $V_{corrected}$ as follows:

$$V_{corrected} = V_{actual} \frac{\left(\frac{V_{initial}}{\% P_{initial}}\right)}{\left(\frac{V_{Part}}{\% P_{part}}\right)} \quad (1)$$

where:

$V_{corrected}$=corrected feedback signal actually used by the closed loop processor;

$V_{actual}$=feedback signal read by optical feedback sensor 16 during actual weld cycle;

$V_{initial}$=feedback signal read initially with no tool and no part;

% $P_{initial}$=percentage of total power used in open loop with no tool and no part;

$V_{part}$=feedback signal read initially in open loop with tool and part at a percentage of total power; and % $P_{part}$=percentage of total power used in open loop with tool and part.

The corrected feedback value used by the closed loop processor, $V_{corrected}$, will be less than the actual feedback signal, $V_{actual}$, seen by optical feedback sensor 16. The actual feedback signal includes additional spurious reflected signal. The corrected feedback has that additional spurious amount cancelled out. This allows the closed loop controlled laser power to be delivered at the top of the part at a known amount specified as per the initial calibration of the machine.

Only steps one and four need to be measured to correct the feedback signal so that a known amount of laser power reaches the top of part 110. Part 110 has some reflectivity that bounces a percentage of the delivered power away from weld joint 114, which is at a distal surface of part 110. This can be further compensated for by steps two and three. With a known actual reflectivity of part 110, laser source 14 power can be boosted to make the delivered power at weld joint 114 equal to the amount requested (minus any dispersion of laser power in part 110).

The reflectivity of the part, $R_{part}$, can be calculated as:

$$R_{part} = \frac{\left(\frac{V_{part}}{\% P_{part}}\right) - \left(\frac{V_{tool}}{\% P_{tool}}\right)}{\left(\frac{V_{mirror}}{\% P_{mirror}}\right) - \left(\frac{V_{tool}}{\% P_{tool}}\right)} \times R_{mirror} \quad (2)$$

where:

$R_{part}$=reflectivity of the part;

$R_{mirror}$=reflectivity of a known partially reflective mirror;

$V_{tool}$=feedback signal read in open loop with a tool but without a part;

% $P_{tool}$=percentage of total power used in open loop with a tool but no part;

$V_{mirror}$=feedback signal read in open loop with a tool and a known partially reflective mirror; and % $P_{mirror}$=percentage of total power used in open loop with tool and known partially reflective mirror.

With part reflectivity, not only is the feedback signal boosted by reflected signals, but also less laser power gets to weld joint 114. If the output power of laser source 14 is boosted by the amount of reflected power, the reduction of laser power due to reflection is compensated for at weld joint 114. The new compensated feedback, $V_{compensated}$, necessary to achieve this new power level is:

$$V_{compensated} = V_{corrected} \times \frac{1}{(R_{part} + 1)} \quad (3)$$

where:

$V_{compensated}$=feedback signal used by the closed loop microcontroller that boosts laser power to weld joint 114 to compensate part reflectivity.

TTIr welding system 10 is now operated in closed loop with the actual optical feedback, $V_{actual}$, modified to the new compensated feedback, $V_{compensated}$, so that the requested laser power is now delivered to weld joint 114 automatically.

Light absorption within parts 110, 112 also reduces the amount of laser power that gets to weld joint 114. If the power of laser source 14 is boosted by both the amount of reflected power and absorbed power, the power from laser source 14 reaching weld joint 114 will be exactly the amount specified.

Equations (1), (2), and (3) above assume that the feedback signal is linear with the light impinging on optical sensor 16. If in some embodiments the response is non-linear, then an appropriate lookup table can be used for optical sensor 16 so that the signal can be modified to be a linear response.

The feedback loop to control laser source 14 can be embedded in electronic hardware, embedded in mechanical hardware, embedded in firmware, embedded in software, or the like. In some embodiments, software and firmware may provide improved flexibility in terms of implementation.

Figure 3:
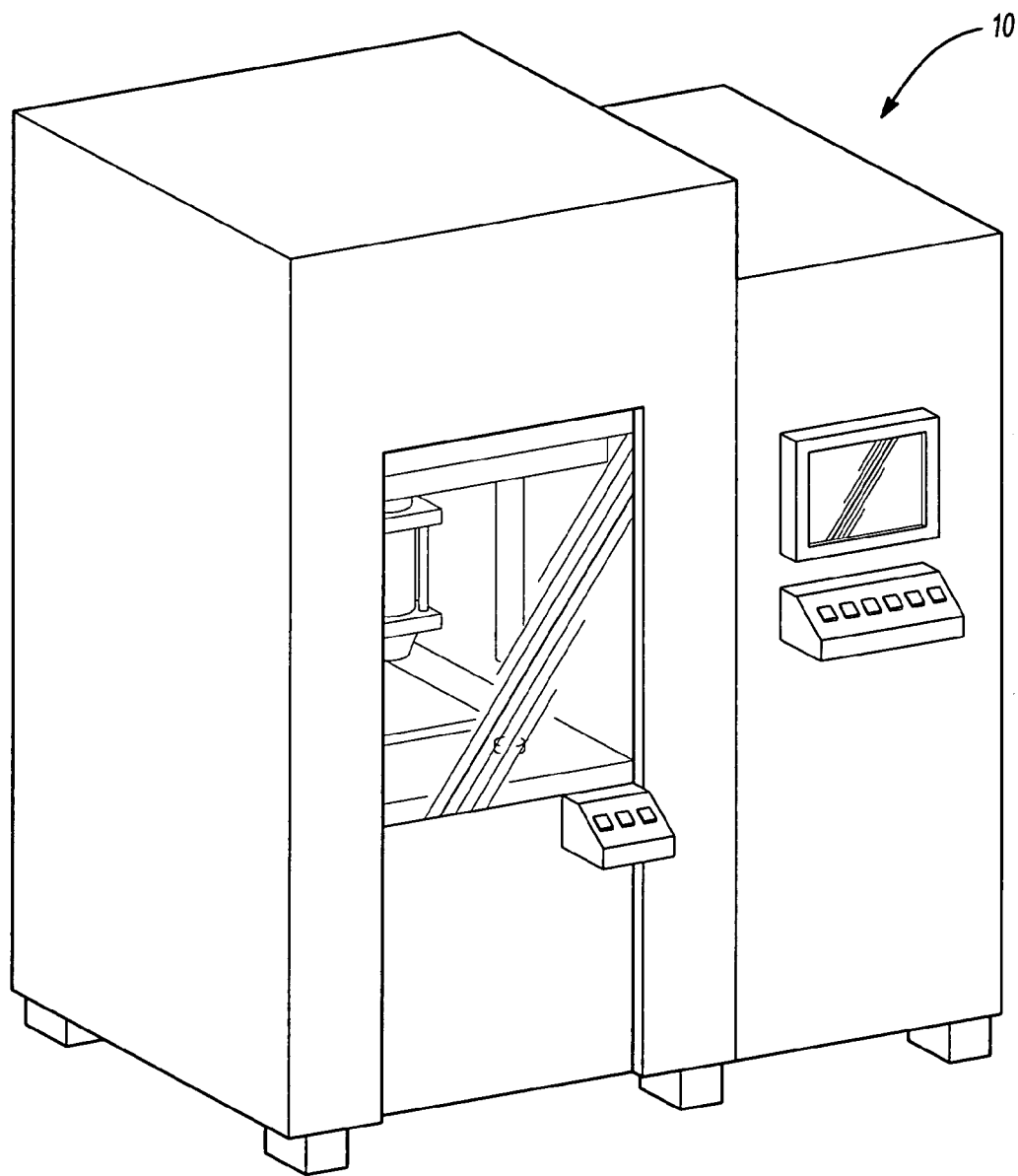
FIG. 3 is a perspective view illustrating an infrared welding machine incorporating the teachings of the present disclosure.
Figure 4:
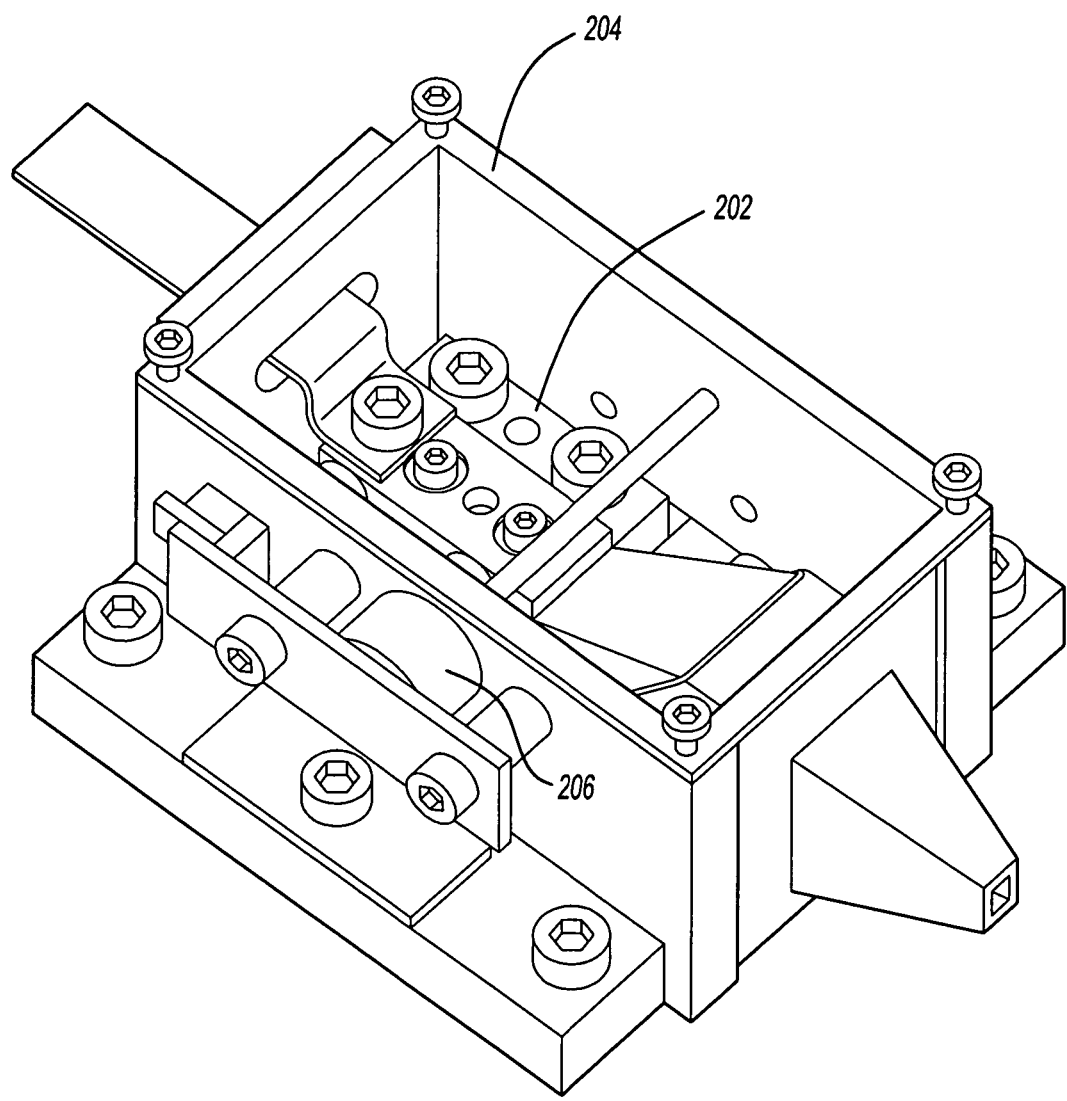
FIG. 4 is a perspective view illustrating a laser diode chamber having a photodiode and a laser diode.

The teachings of the present disclosure have been tested on a Branson IRAM L-386FAi infrared laser plastics welding machine (see FIG. 3). As seen in FIG. 4, the light from a laser diode 202 is detected in the laser diode chamber 204 by a photodiode 206, upstream from any fiber optic and waveguide tooling. The various open loop feedback signals are recorded on memory, and the control algorithm for the various machine states needed for the compensation resides in software in the machine controller.

Allowing for automatic closed loop feedback signal correction for reflected signals from tooling and parts downstream of optical feedback sensor 16 has a major advantage. The power of laser source 14 reaching the part will be known quantitatively, and the process is automatic. Previous methods required a time consuming iterative approach of manually adjusting power to achieving the desired power level in a closed loop system, because the feedback signal would be altered by reflection off the part. The teachings of the present disclosure provide automatic calibration of the laser source using a precise baseline. The feedback signal is then compensated for this calibration. The precise baseline and closed loop control enable reliable delivery of laser power to the weld zone.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A feedback control system for controlling a laser source, said feedback control system comprising:
   a laser source outputting laser energy;
   an optical sensor detecting said laser energy, said optical sensor outputting a measured signal in response to a measured amount of said laser energy;
   an optical device receiving said laser energy and directing said laser energy to a predetermined location, said optical device further reflecting a first portion of said laser energy toward said optical sensor; and
   a controller receiving said measured signal from said optical sensor, said controller calculating said first portion of said laser energy, said controller adjusting said laser source to correct for said first portion of said laser energy reflecting from said optical device to obtain a predetermined amount of laser energy at said predetermined location,
   wherein said predetermined location is a weld joint disposed between a transmissive part and an absorptive part, at least one of said transmissive part and said absorptive part reflecting and/or absorbing a second portion of said laser energy; and
   said controller calculating said second portion of said laser energy, said controller adjusting said laser source to correct for said second portion of said laser energy reflecting from and/or absorbing in said at least one of said transmissive part and said absorptive part.

2. The feedback control system according to claim 1 wherein said optical device is a waveguide.

3. The feedback control system according to claim 1 wherein said optical device is a fiber optic.

4. A feedback control system for controlling a laser source, said feedback control system comprising:
   a laser source outputting laser energy;
   an optical sensor detecting said laser energy, said optical sensor outputting a measured signal in response to a measured amount of said laser energy;
   an optical device receiving said laser energy and directing said laser energy to a predetermined location, said optical device further reflecting a first portion of said laser energy toward said optical sensor; and
   a controller receiving said measured signal from said optical sensor, said controller calculating said first portion of said laser energy, said controller adjusting said laser source to correct for said first portion of said laser energy reflecting from said optical device to obtain a predetermined amount of laser energy at said predetermined location, wherein said controller records an initial power level output from said laser source and an initial signal from said optical sensor and further records a part power level output from said laser source and a part signal from said optical sensor when a part to be welded is positioned for welding, said controller determining a compensated signal by multiplying said measured signal by a ratio of said initial signal divided by said initial power level output over said part signal over said part power level output, said controller adjusting said laser source using said compensated signal.

5. A method of calibrating a laser source outputting laser energy for use in welding a first part to a second part, said method comprising:
   activating said laser source at an initial power level percentage, $\% P_{initial}$, to output laser energy and measuring said laser energy as an initial optical feedback signal, $V_{initial}$;
   activating said laser source at a part power level percentage, $\% P_{part}$, to output laser energy, directing the laser energy as at least one of said first part and said second part, measuring said laser energy as a part feedback signal, $V_{part}$;
   determining a corrected control value, $V_{corrected}$, according to the following relationship:

$$V_{corrected} = V_{actual} \frac{\left(\frac{V_{initial}}{\% P_{initial}}\right)}{\left(\frac{V_{Part}}{\% P_{part}}\right)}$$

wherein $V_{actual}$ is a feedback signal measured during an actual welding operation; and controlling said laser source in response to said corrected control value, $V_{corrected}$.

6. The method according to claim 5, further comprising:
providing an optical device receiving laser energy from said laser source and directing said laser energy to a predetermined location, said optical device reflecting a first portion of said laser energy; and
activating said laser source at a tool power level percentage, $\% P_{tool}$, to output laser energy and measuring laser energy as a tool feedback signal, $V_{part}$, said tool feedback signal being in response to laser energy received directly from said laser source and said first portion of said laser energy reflected by said optical device.

7. The method according to claim 6, further comprising:
providing a substrate having a known reflectivity, $R_{substrate}$; and
activating said laser source at a substrate power level percentage, $\% P_{substrate}$, to output laser energy at said substrate and measuring laser energy as a substrate feedback signal, $V_{substrate}$.

8. The method according to claim 7, further comprising:
determining a reflectivity of at least one of said first part and said second part, $R_{part}$, according to the following relationship:

$$R_{part} = \frac{\left(\frac{V_{part}}{\% P_{part}}\right) - \left(\frac{V_{tool}}{\% P_{tool}}\right)}{\left(\frac{V_{substrate}}{\% P_{substrate}}\right) - \left(\frac{V_{tool}}{\% P_{tool}}\right)} \times R_{substrate}.$$

9. The method according to claim 8, further comprising:
determining a compensated control value, $V_{compensated}$, compensating for the loss of laser energy due to at least one of said first part and said second part absorptive according to the following relationship:

$$V_{compensated} = V_{corrected} \times \frac{1}{(R_{part} + 1)}.$$

10. A method of controlling a laser source outputting laser energy for use in welding a transmissive part to an absorptive part, said laser source outputting laser energy through an optical device toward at least one of said transmissive part and said absorptive part, said method comprising:
determining an amount of loss of laser energy associated with reflection within said optical device;
determining an amount of loss of laser energy associated with reflection off at least one of said first part and said second part;
determining an amount of loss of laser energy associated with absorption of laser energy within at least one of said transmissive part and said absorptive part;
controlling the output of said laser source to account for said loss of laser energy associated with reflection within said optical device, said loss of laser energy associated with reflection off at least one of said first part and said second part, and said loss of laser energy associated with absorption of laser energy within at least one of said transmissive part and said absorptive part; and
directing said output of said laser source toward said transmissive part and said absorptive part to produce a weld therebetween.

* * * * *